United States Patent [19]

Arndt

[11] Patent Number: 5,088,969
[45] Date of Patent: Feb. 18, 1992

[54] BIFURCATED TRANSMISSION DRIVE

[75] Inventor: Heinrich Arndt, Augsburg, Fed. Rep. of Germany

[73] Assignee: Renk Tacke GmbH, Augsburg, Fed. Rep. of Germany

[21] Appl. No.: 644,256

[22] Filed: Jan. 22, 1991

[30] Foreign Application Priority Data

Feb. 2, 1990 [DE] Fed. Rep. of Germany ....... 4003173

[51] Int. Cl.⁵ ............................................. F16H 1/42
[52] U.S. Cl. .................................... 475/201; 475/249; 475/332
[58] Field of Search .............. 475/201, 221, 225, 213, 475/249, 332

[56] References Cited

FOREIGN PATENT DOCUMENTS 2631899 12/1989 France ............................... 475/221
1-295052 11/1989 Japan ................................. 475/221

*Primary Examiner*—Leslie A. Braun
*Assistant Examiner*—William O. Trousdell
*Attorney, Agent, or Firm*—Natter & Natter

[57] ABSTRACT

A bifurcated transmission drive includes one input shaft and at least two output shafts. The input shaft drives a planetary differential gear having two output elements. One output element drives one output shaft through a first gear train while the other output element drives the other output shaft through a second gear train. The first gear train and the second gear train are coupled through an interconnecting third gear train. As a result, the two output shafts will rotate at the same speed and with the same torque independent of the loads on the output shafts.

18 Claims, 3 Drawing Sheets

BIFURCATED TRANSMISSION DRIVE

BACKGROUND OF THE INVENTION

1. Field of the Invention

This invention relates generally to power trains for roller mills and more particularly to transmissions for rotating opposed rollers in opposite directions at the same speed.

2. Related History

Roller mills for shaping ingots, billets and other stock employed rolling compressive forces for reducing thickness and elongating. The stock material or work piece to be rolled was fed between opposed rollers which were driven in opposite directions and which exerted compressive forces.

In some rolling mill drives, separate electric motors were provided for each of the opposed rollers with the drives configured for rotating the rollers at the same speed but in opposite directions. Some of these drives were inherently unstable, however, and utilized the torque of one motor to balance the other motor in order to synchronize driving speeds. As a result, the two rollers could not be driven constantly at the same speed and with the same torque. Further, such system was not capable of being mounted to a foundation support but rather straddled its inputs and outputs.

In addition, use of these drive systems also resulted in a considerable wear on rotating tires of the roller mill, the replacement of which was quite complicated and time consuming.

SUMMARY OF THE INVENTION

A bifurcated transmission drive for a pair of opposed rollers in a rolling mill includes a planetary differential gear. A single motor drives a sun gear input of the planetary differential gear through an intermediate gearing. One transmission output shaft is driven by a planet wheel carrier of the planetary differential gear through a first gear train while the other transmission output shaft is driven by ring gear of the planetary differential gear through a second gear train. The first and the second gear trains are coupled by an interconnecting third gear train. Irrespective of differences between the loads applied to the mill rollers and changes in such loads, the output shafts of the bifurcated transmission drive will rotate at the same speed and with the same torque.

From the foregoing compendium, it will be appreciated that it is a consideration of the present invention to provide a bifurcated transmission drive of the general character described which is not subject to the disadvantages of the related history aforementioned.

It is an aspect of the present invention to provide a bifurcated transmission drive of the general character described wherein a pair of output shafts will be driven at the same speed and the same torque irrespective of differences between the loads applied to the output shafts.

A feature of the present invention is to provide a bifurcated transmission drive of the general character described which is self stabilizing and may be mounted rigidly to a support foundation.

A further feature of the present invention is to provide a bifurcated transmission drive of the general character described which is simple in design and fabricated with but a modicum of components.

To provide a bifurcated transmission drive of the genera character described which simplifies replacement of rolling mill components such as tires is yet a further consideration of the present invention.

Another aspect of the present invention is to provide a bifurcated transmission drive of the general character described which reduces wear on rolling mill tires.

To provide a bifurcated transmission drive of the general character described which is relatively low in cost is yet a further consideration of the present invention.

Another feature of the present invention is to provide a bifurcated transmission drive of the general character described which is well suited for low cost mass production fabrication.

A further aspect of the present invention is to provide a bifurcated transmission drive of the general character described which is free of speed variations in its output shafts regardless of varying loads on such shafts.

Other aspects, features and considerations in part will be obvious and in part will be pointed out hereinafter.

With these ends in view, the invention finds embodiment in certain combinations of elements, arrangements of parts and series of steps by which the said aspects, features and considerations and certain other aspects, features and considerations are attained, all with reference to the accompanying drawing and the scope of which will be more particularly pointed out and indicated in the appended claims.

BRIEF DESCRIPTION OF DRAWINGS

In the accompanying drawings in which are shown one of the various exemplary embodiments of the invention.

DESCRIPTION OF THE PREFERRED EMBODIMENTS

Figure 1:
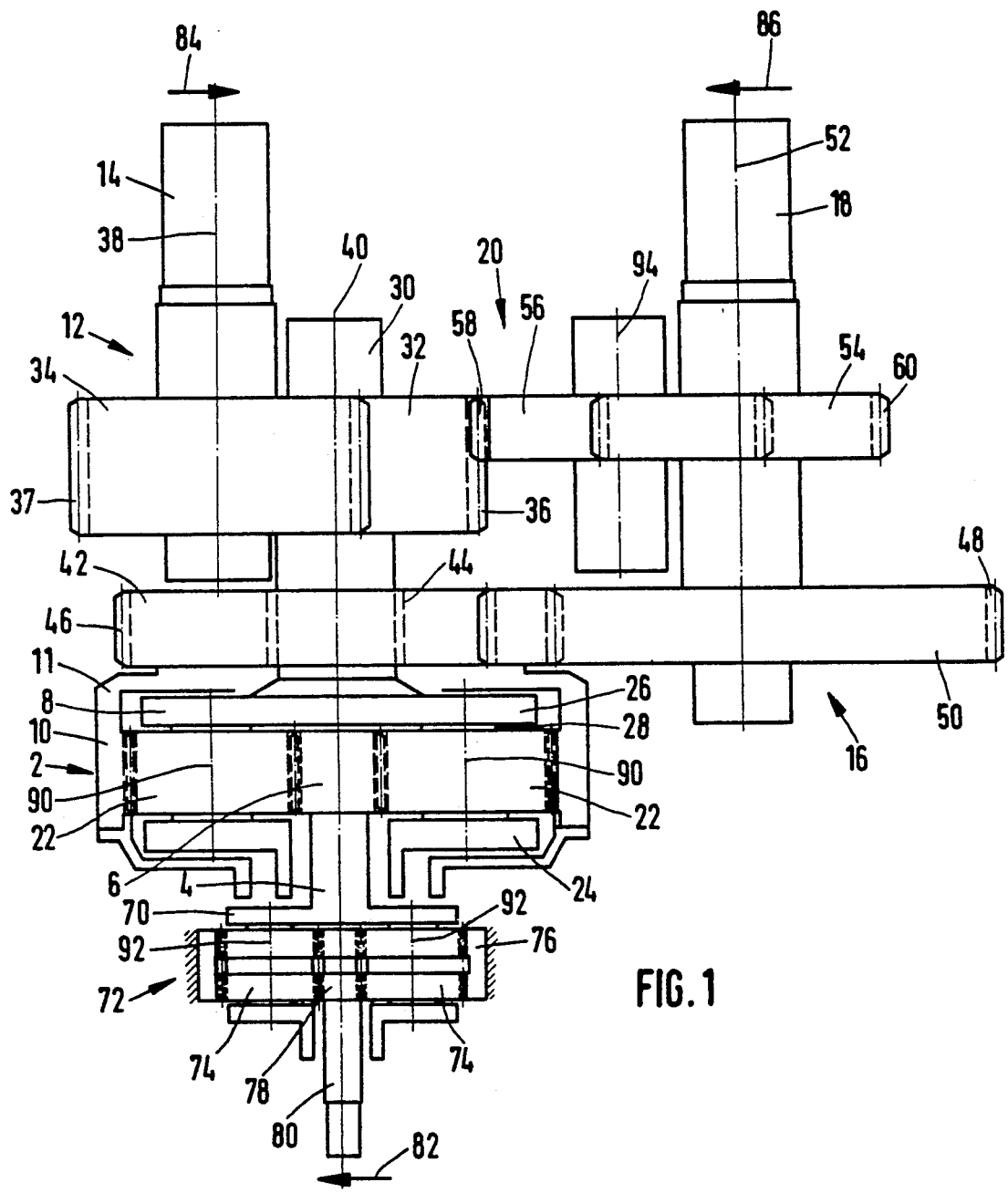
FIG. 1 is a schematized top plan view of a bifurcated transmission drive constructed in accordance with the invention and showing a planetary differential gear having one output coupled to a planet gear carrier and another output coupled to a ring gear with each output driving a separate output shaft through a separate gear train.

Referring now in detail to the drawings, illustrated in the figures is a bifurcated transmission drive constructed in accordance with and embodying the invention. The bifurcated transmission drive includes a planetary differential gear, denoted generally by the reference numeral 2. The planetary differential gear 2 comprises a sun gear 6, a plurality of planet gears 22 and a ring gear 10 having internal teeth, all having a common axis 40. The planet gears 22 are interconnected through a planet gear carrier 8 which includes a front carrier plate 24 and a rear carrier plate 26 interconnected to one another in spaced parallel relationship by a plurality of bearings 28. The planet gears 22 rotate about axes 90 of the bearings 28.

In a conventional manner, the teeth of the sun gear 6 engage the teeth of the planet gears 22 so that when the sun gear 6 is driven, the planet gears 22 rotate about the bearings 28. In addition, the teeth of the planet gears 22 engage the internal teeth of the ring gear 10 so that the planet gears 22 orbit about the axis 40.

Accordingly, if the sun gear 6 is driven as an input of the planetary differential gear 2, the planet gears 22 will be caused to rotate about their respective bearings 28 as well as causing both the ring gear 10 and the planet gear carrier 8 to rotate about the common axis 40.

In accordance with the invention, a first gear train 12 is driven by the planet carrier 8 while a second gear train 16 is driven by the ring gear 10. In FIG. 1, wherein components of the first gear train 16 are depicted, it will be seen that a shaft 30 is fixed to the rear carrier plate 26 in a position coaxial with the common axis 40. Preferably, the shaft 30 and carrier plate 26 are formed as one integral part. A first gear 32 is fixed to the shaft 30 at a position spaced axially from the rear carrier plate 26. The first gear 32 includes an array of teeth 36 which are in meshing engagement with an array of teeth 37 of a second gear 34. The second gear 34 is fixed to a output shaft 14 of the bifurcated transmission drive. The output shaft 14 rotates about an axis 38 which is parallel to the axis of rotation 40, common to both the shaft 30 and the planetary differential gear 2. Preferably, the second gear 34 of the first gear train 12 is formed together with the output shaft 14 as a single integral unit.

Turning now to the second gear train 16, such gear train includes a first gear 42 which is positioned coaxially over the shaft 30 and is axially disposed between the rear carrier plate 26 and the first gear 32 of the first gear train 12. It should be noted that a central bore 44 of the gear 42 is larger than the shaft 30 and the gear 42 rotates independently of the shaft 30. A collar 11 interconnects the gear 42 with the ring gear 10 for unitary rotation.

The first gear 42 includes external teeth 46 which are in driving engagement with an array teeth 48 of a second gear 50 which is fixed to a second output shaft 18 of the bifurcated transmission drive. In lieu of employing the gear 42 for driving the gear 50, the ring gear 10 may be provided with external teeth and the gear 50 may be axially displaced forwardly for engagement with the ring gear 10. It will be noted that an axis of rotation 52 of the second output shaft and the second gear 50 is parallel to the axes of rotation 38 and 40.

As previously mentioned, a connecting gear train 20 is also provided. The connecting gear train 20 includes a gear 54 which is fixed to the second output shaft 18 in coaxial relationship. The gear 54 preferably forms one integral part together with the second output shaft 18. An array of teeth 60 formed on the gear 54 is in driving engagement with an array of teeth 58 of an intermediate gear 56. The gear 56 is mounted to a shaft having an axis of rotation 94. The teeth 58 of the gear 56 simultaneously engage, not only the teeth 60 of the gear 54, but the teeth 36 of the gear 32 of the first gear train 12.

In order to assure that both output shafts 14, 18 rotate at the same speed, pitch diameters of the gears 60 and 56 of the connecting gear train are equal to each other and equal to the pitch diameters of the gears 32 and 34 of the first gear train 12.

An intermediate gearing is provided between a driving motor (not shown) and the input of the planetary differential gear 2. At its forward end, i.e., the end facing away from the first gear train 12, the planetary differential gear 2 includes an input shaft 4 which is in driving engagement with the sun gear 6. The input shaft 4 is fixed to the intermediate gearing which comprises a planetary differential gear 72. The planetary differential gear 72 is coaxial with the planetary differential gear 2 and includes a planet gear carrier 70 which engages the input shaft 4. Also provided in the planetary differential gear 72 is a plurality of planet gears 74 which simultaneously mesh with a stationary ring gear 76 and a sun gear 78. The sun gear 78 is driven by a drive shaft 80, which is driven by the motor.

The direction of rotation of the drive shaft 80 is illustrated by the heavy arrow 82 while the directions of rotation of the output shafts 14, 18 are illustrated by the heavy arrows 84, 86 respectively. The axes of rotation 90, 92 and 94 are parallel to the axes of rotation 38, 52 of the output shafts and are parallel to the axis 40 of the planetary differential gears 2, 72. It should also be appreciated that all of the gears of the bifurcated transmission drive may comprise simple spur gears.

Figure 3:
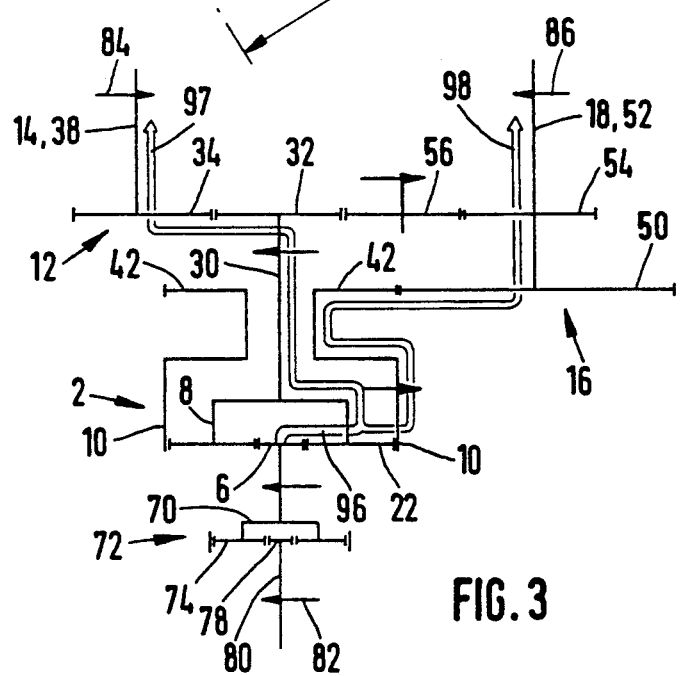
FIG. 3 is a simplified plan view of the bifurcated transmission drive and illustrating torque or power flow as well as the directions of rotation of the various components.

In FIG. 3 double line arrows have been employed to indicate power flow, hence, torque flow through the bifurcated transmission drive.

Power and torque from the sun gear 6 of the planetary differential gear 2 is bifurcated into one component 97 which flows through the planet gear carrier 8 and through the first gear train 12 to the output shaft 14 and another component 98 of equal magnitude which flows through the ring gear 10 and the second gear train 16 to the output shaft 18.

In the event the output shaft 14 is slowed down, for example, due to increased load resistance, the planet carrier 8 will tend to slow down which results in a tendency for acceleration of the ring gear 10. Actual acceleration of the ring gear 10, is prevented and there is no increase in speed of the output shaft 18 due to the connecting gear train 20 which assures speed equalization and torque equalization in the two gear trains 12, 16, hence the two output shafts. In the event the output shaft 18 is slowed down, the ring gear 10 also slows down, resulting in a tendency for acceleration of the carrier 8. Actual acceleration of the carrier 8 is prevented and there is no increase in the speed of the output shaft 14 because of speed and torque equalization between the gear trains 12 and 16 through the connecting gear train 20. Similarly, torque and speed equalization takes place in the event one of the two output shafts 14, 18 becomes faster than the other.

Because of the immediate equalization of speed and torque differences in the output shafts 14, 18, through the planetary differential gear 2 and the connecting gear train 20, there practically never is any actual difference in speeds, but only the potential for such differences. Thus, even in the event the output shafts 14, 18 are stressed with unequal loads, the speed and torque of the two output shafts 14, 18 always remain equal.

Figure 2:
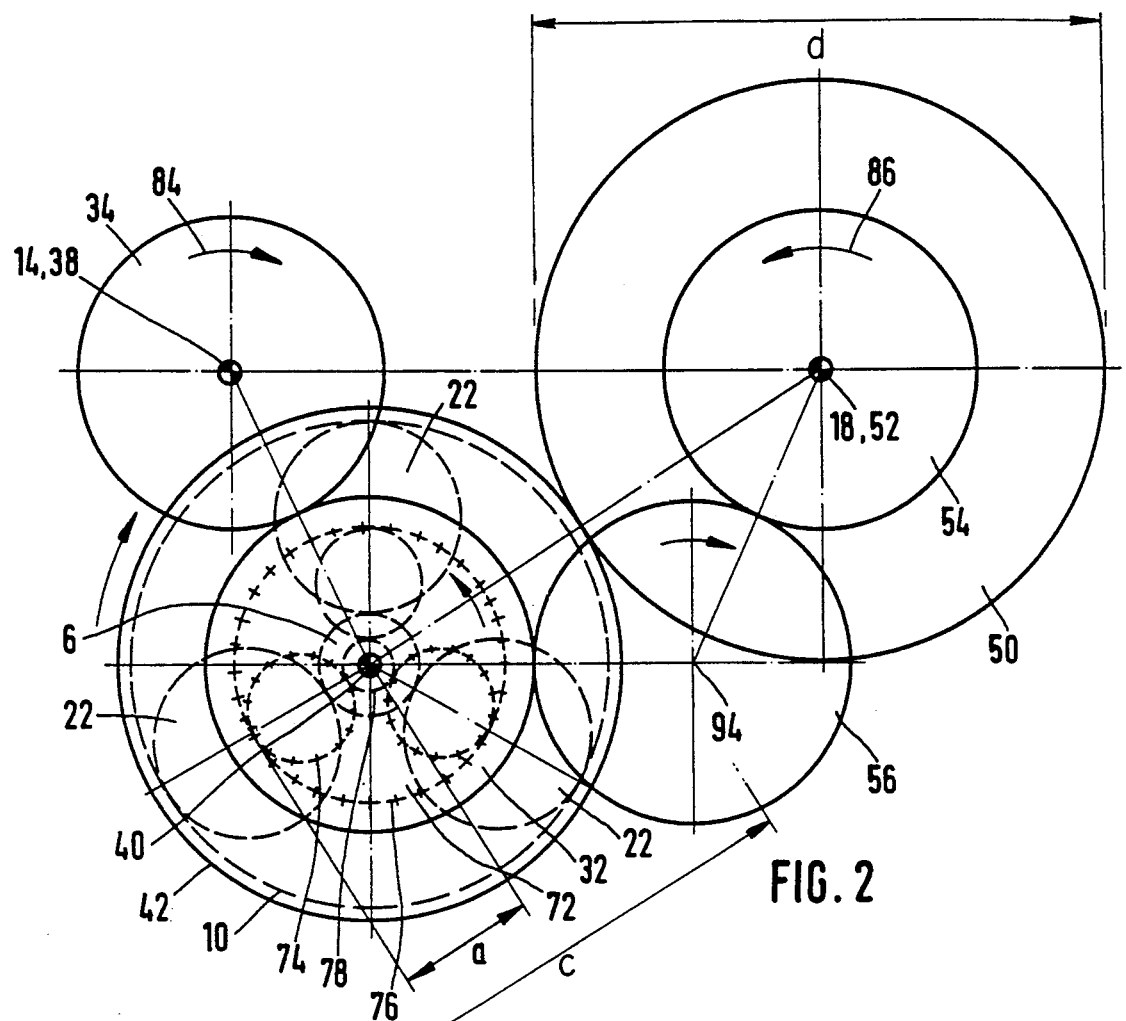
FIG. 2 is a schematized front view of the bifurcated transmission drive with various gears shown in outline only and transparent for the purpose of more clearly illustrating gear directions of rotation and pitch diameters.
Figures 4, 5:
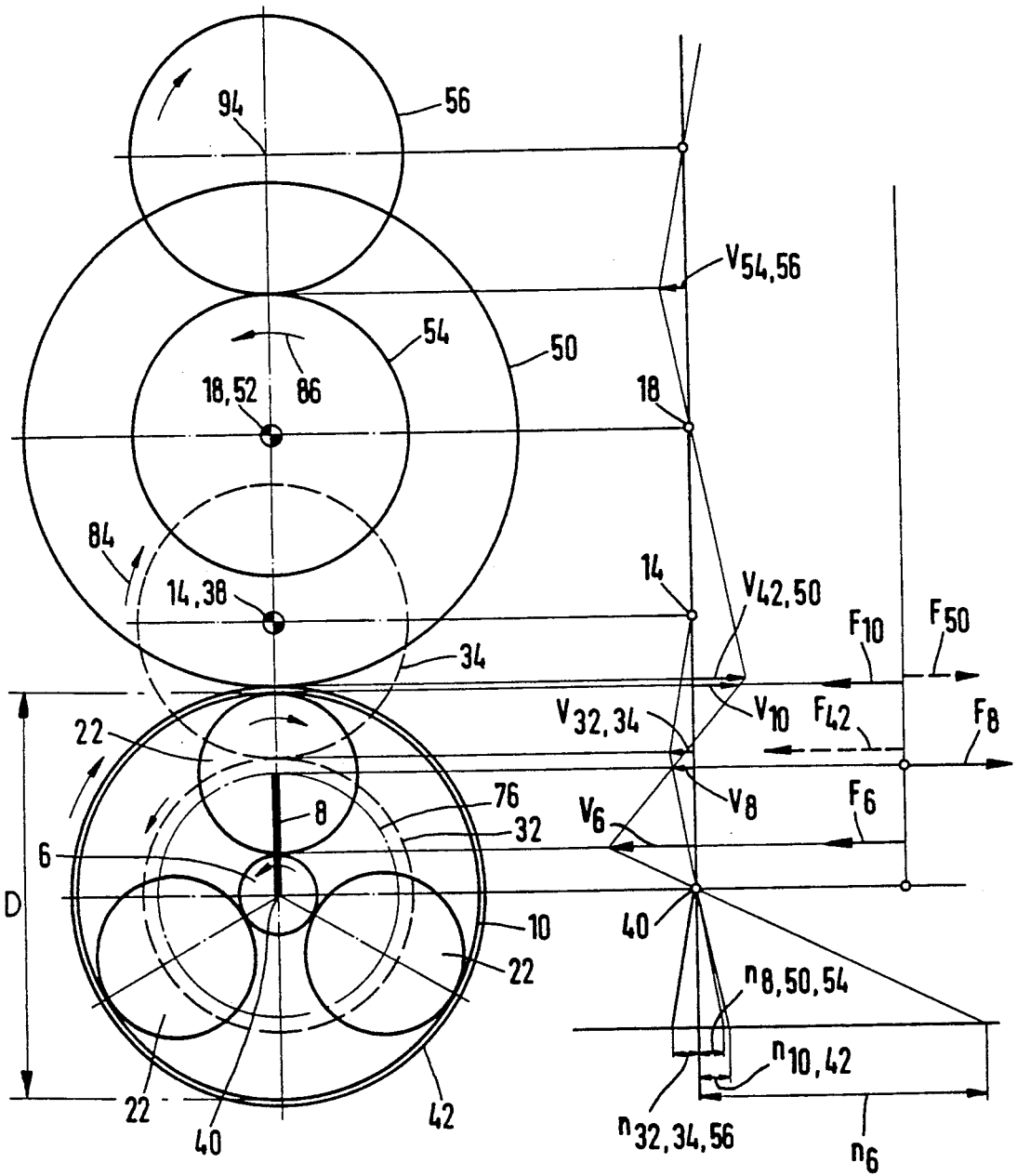
FIG. 4 is a schematized front view of the bifurcated transmission drive with the component arrangement distorted with all of the axes of rotation in a single vertical plane for the purpose of illustration only and showing directions of rotation and pitch diameter.
FIG. 5 is a graphic illustration of the number of revolutions, circumferential speeds and tangential forces at the pitch circles of the various gears in the bifurcated transmission drive with the X-axis corresponding to the vertical axis depicted in FIG. 4.

The respective forces, torques, number of revolutions and circumferential speeds in the pitch circles of the elements of the bifurcated transmission driver are graphically depicted in FIGS. 2, 4 and 5. The graphic representations should be considered in light of the following definitions:

| Symbol | Meaning |
| --- | --- |
| F | force |
| T | torque |
| n | number of revolutions |
| V | speed |
| a | spacing between the axis of rotation 40 of the sun gear 78 and the pitch circle of the ring gear 76 |
| D | pitch diameter of the ring gear 10 |
| d | pitch diameter of the gear 50 |
| c | pitch diameter of the gear 42 |
| r | radius of the pitch diameter of a gear defined by a reference number at "r" |
| subscript reference number with one of above symbols | value for the respective gear; for the planet carrier 8 the letters denote the value at the axes of rotation 90 |

The speed and torque of one of the output shafts 14, 18 is always equal to that of the other shaft. Thus, the invention meets the conditions:

$$T_{14} = T_{18}$$

$$n_{14} = n_{18}$$

This is calculated from the formulas:

$$\frac{d}{c} = \frac{2 \times a}{D_{10}/2}$$

$$T_{14} = 6 \times F \times (r_6 + r_{22})$$

$$T_{18} = 3 \times F \times (r_6 + 2r_{22}) \times d/c$$

Thus it will be seen that there is provided a bifurcated transmission drive of the general character described which achieves the various aspects, features and considerations of the present invention and which is well suited to meet the conditions of practical usage.

It should be noted that all arrows shown in the drawings indicate the direction of rotation of the gear associated with such arrows. It is evident that all directions of rotation may be reversed, and that the configuration shown in the drawings is merely exemplary.

As various changes might be made the bifurcated transmission drive as above set forth without departing from the spirit of the invention, it is to be understood that all matter herein described or shown in the accompanying drawings is to be interpreted as illustrative and not in a limiting sense.

Having thus described the invention what is claimed as new and desired to be secured by letters patent:

1. A bifurcated transmission drive, the drive including an input shaft, a first output shaft and a second output shaft, the drive further including a differential gear, the differential gear having an input element, a first output element and a second output element, the bifurcated transmission drive further including a first gear train drivingly interconnecting the first output element and the first output shaft and a second gear train drivingly interconnecting the second output element and the second output shaft, the first gear train including a shaft, means fixing the first gear train shaft to the first output element, the second gear train including a first gear, means for positioning the first gear concentric with the first gear train shaft and for rotation relative to the first gear train shaft, means drivingly interconnecting the first gear with the second output element, the bifurcated transmission drive further including a third gear train mutually interconnecting the first gear train with the second gear train whereby the first output shaft and the second output shaft may be driven without speed variations regardless of variations in the loads on the respective output shafts.

2. A bifurcated transmission drive as constructed in accordance with claim 1 wherein the third gear train engages the first and second gear train on the side of the first gear which faces the first output shaft.

3. A bifurcated transmission drive as constructed in accordance with claim 1 wherein the first gear is positioned axially along the shaft, the shaft extending through an axial aperture in the first gear.

4. A bifurcated transmission drive as constructed in accordance with claim 1 wherein the means drivingly interconnecting the first gear with the second output element comprises a collar, the collar being coaxial with the shaft.

5. A bifurcated transmission drive as constructed in accordance with claim 1 wherein the second gear train includes a second gear, the first gear being in driving engagement with the second gear, the second gear being coaxial with the second output shaft and fixed relative to the second output shaft.

6. A bifurcated transmission drive as constructed in accordance with claim 1 wherein the first gear train includes a first gear, the first gear of the first gear train being coaxial with the shaft, means fixing the first gear of the first gear train to the shaft for unitary rotation therewith, the first gear of the first gear train being positioned on the side of the first gear of the second gear train facing the first output shaft, the first gear train further including a second gear, means mounting the second gear of the first gear train coaxial with the first output shaft, the mounting means further including means fixing the second gear of the first gear train for unitary rotation with the first output shaft.

7. A bifurcated transmission drive as constructed in accordance with claim 6 wherein the third gear train includes a first gear, means mounting the first gear of the third gear train coaxial with the second output shaft, the mounting means including means fixing the first gear of the third gear train for unitary rotation with the second output shaft, the third gear train further includes an intermediate gear, the first gear of the third gear train being in driving engagement with the intermediate gear, the intermediate gear being in driving engagement with the first gear of the first gear train.

8. A bifurcated transmission drive as constructed in accordance with claim 7 wherein the first gear of the first gear train, the second gear of the first gear train, the first gear of the third gear train and the intermediate gear of the third gear train have pitch diameters of the same size whereby the first and the second output shafts rotate at the same speed.

9. A bifurcated transmission drive as constructed in accordance with claim 1 further including an intermediate gearing, the intermediate gearing including an input shaft, means connecting a drive shaft to the intermediate gearing input shaft, the intermediate gearing further including an output element, the bifurcated transmission drive further including means connecting the intermediate gearing output element to the differential gear input element.

10. A bifurcated transmission drive as constructed in accordance with claim 1 wherein the differential gear comprises a planetary gear having a sun gear, a plurality of planet gears, a planet carrier and a ring gear, the input element comprising the sun gear, the first output element comprising the planet carrier and the second output element comprising the ring gear.

11. A bifurcated transmission drive as constructed in accordance with claim 9 wherein the intermediate gearing comprises a planetary gear having a sun gear, a plurality of planet gears, a planet carrier and a ring gear, the input shaft being connected to the sun gear, the intermediate gearing output element comprising the planet carrier and means for rendering the ring gear stationary.

12. A bifurcated transmission drive as constructed in accordance with claim 2 wherein the first gear is positioned axially along the shaft and the third gear train engages the first and second gear trains on the side of the first gear which faces away from the differential gear.

13. A bifurcated transmission drive, the drive including an input shaft, a first output shaft and a second output shaft, a single planetary differential gear, the single planetary differential gear having a sun gear element, plurality of planet gears, a planet carrier element and a ring gear element, one of the elements being engaged by the input shaft, the other elements of the single planetary differential gear comprising output elements, a first gear train drivingly interconnecting the first output shaft with one of the output elements and a second gear train drivingly interconnecting the second output shaft with the other output element, and a third gear training mutually interconnecting the first gear train with the second gear train.

14. A bifurcate transmission drive as constructed in accordance with claim 13 the sun gear element is engaged by the input shaft.

15. A bifurcated transmission drive as constructed in accordance with claim 13 wherein the first gear train includes a shaft, means fixing the shaft to the first output element, the second gear train includes a first gear, means for positioning the first gear concentric with the shaft and for rotation relative to the shaft, means drivingly interconnecting the first gear with the second output element, the third gear train engaging the first and second gear trains on the side of the first gear which faces the first output shaft.

16. A bifurcated drive as constructed in accordance with claim 15 wherein the first gear train includes a first gear, the first gear of the first gear train being coaxial with the shaft, means fixing the first gear of the first gear train to the shaft for unitary rotation therewith, the first gear of the first gear train being positioned on the side of the first gear of the second gear train facing the first output shaft, the first gear train further including a second gear, means mounting the second gear of the first gear train coaxial with the first output shaft, the mounting means further including means fixing the second gear of the first gear train for unitary rotation with the first output shaft.

17. A bifurcated transmission drive as constructed in accordance with claim 15 further including an intermediate gearing, the intermediate gearing including an input shaft, means connecting a drive shaft to the intermediate gearing input shaft, the intermediate gearing further including an output element, the bifurcated transmission drive further including means connecting the intermediate gearing output element to the differential gear input element.

18. A bifurcated transmission drive as constructed in accordance with claim 17 wherein the intermediate gearing comprises a planetary gear having a sun gear, a plurality of planet gears, a planet carrier and a ring gear, the input shaft being connected to the last mentioned sun gear, the intermediate gearing output element comprising the planet carrier and means for rendering the ring gear stationary.

* * * * *